(12) United States Patent
Lafrance et al.

(10) Patent No.: US 10,175,142 B2
(45) Date of Patent: Jan. 8, 2019

(54) MULTIPLE-FIBER CONNECTOR INSPECTION

(71) Applicant: EXFO INC., Québec (CA)

(72) Inventors: Denis Lafrance, Québec (CA);
Bernard Ruchet, Québec (CA); Robert Baribault, Québec (CA)

(73) Assignee: EXFO Inc., Quebec (CA)

( * ) Notice: Subject to any disclaimer, the term of this patent is extended or adjusted under 35 U.S.C. 154(b) by 306 days.

(21) Appl. No.: 15/193,180

(22) Filed: Jun. 27, 2016

(65) Prior Publication Data

US 2017/0003195 A1   Jan. 5, 2017

Related U.S. Application Data

(60) Provisional application No. 62/188,247, filed on Jul. 2, 2015, provisional application No. 62/258,098, filed on Nov. 20, 2015.

(51) Int. Cl.

| | |
|---|---|
| *G01N 21/00* | (2006.01) |
| *G01M 11/00* | (2006.01) |
| *G06T 7/00* | (2017.01) |
| *H04N 5/225* | (2006.01) |
| *H04B 10/00* | (2013.01) |

(Continued)

(52) U.S. Cl.
CPC .......... *G01M 11/30* (2013.01); *G02B 6/385* (2013.01); *G02B 6/3885* (2013.01); *G02B 21/0016* (2013.01); *G06T 7/0004* (2013.01); *H04B 10/12* (2013.01); *H04N 5/2251* (2013.01); *G06T 2207/10056* (2013.01); *H04N 2005/2255* (2013.01)

(58) Field of Classification Search
CPC ........... G01M 11/3145; G01M 11/335; G01M 11/33; G01M 11/3109; G01M 11/338
USPC ...................................................... 356/73.1
See application file for complete search history.

(56) References Cited

U.S. PATENT DOCUMENTS

| | | |
|---|---|---|
| 537,681 A | 4/1895 | Furbish |
| 4,595,265 A | 6/1986 | Hodgson et al. |
| 5,127,725 A | 7/1992 | Muller et al. |

(Continued)

OTHER PUBLICATIONS

Casemir Decusatis, "SSF comparison", The Optical Communication Reference, Elsevier, p. 237, Nov. 23, 2009, ISBN: 978-0-12-375163-8, XP055444626.

(Continued)

*Primary Examiner* — Md M Rahman
(74) *Attorney, Agent, or Firm* — Erise IP, P.A.

(57) ABSTRACT

An inspection system for inspecting a multiple-fiber connector is provided. The inspection system includes a microscope probe and a probe tip configured to provide an optical path between the microscope probe and the multiple-fiber connector. The probe tip and microscope probe are configured so that the field of view of the microscope probe is sufficiently large to cover a portion of the connector surface encompassing a plurality of the optical fiber endfaces. The system further includes a shifting mechanism operable to shift the field of view of the microscope probe between at least two discrete positions over the connector surface. Each discrete position encompasses a different subset of the multiple optical fiber endfaces and optionally at least one positioning reference. A probe tip and a method of inspection are also provided.

22 Claims, 14 Drawing Sheets

(51) Int. Cl.
   *G02B 6/38*   (2006.01)
   *G02B 21/00*  (2006.01)

(56)              References Cited

U.S. PATENT DOCUMENTS 6,459,490 B1    10/2002  Kuhn et al.
   6,466,366 B1    10/2002  Dominique
   6,751,017 B2     6/2004  Cassady
   6,879,439 B2     4/2005  Cassady
   7,042,562 B2     5/2006  Kiani et al.
   7,239,788 B2     7/2007  Villeneuve
   7,336,884 B2     2/2008  Zhou et al.
   8,104,976 B2 †   1/2012  Zhou
   8,988,670 B2 †   3/2015  Zhou
   9,151,694 B2 †  10/2015  Wilson
   9,589,342 B2 †   3/2017  Theberge
   2008/0019656 A1  1/2008  Zhou
   2014/0063598 A1  3/2014  Zhou et al.
   2014/0268114 A1  9/2014  Zhou et al.
   2015/0092043 A1  4/2015  Baribault

OTHER PUBLICATIONS

Communication Pursuant to Article 94(3) EPC dated Jan. 31, 2018; Application No. 16 177 057.3; Applicant: EXFO Inc.
Third-Party Observations against EP Application EP16177057.3 dated Apr. 6, 2018; Applicant: EXFO Inc.
European Search Report dated Nov. 2, 2016; European Patent Application No. EP 16 17 7057.

† cited by third party

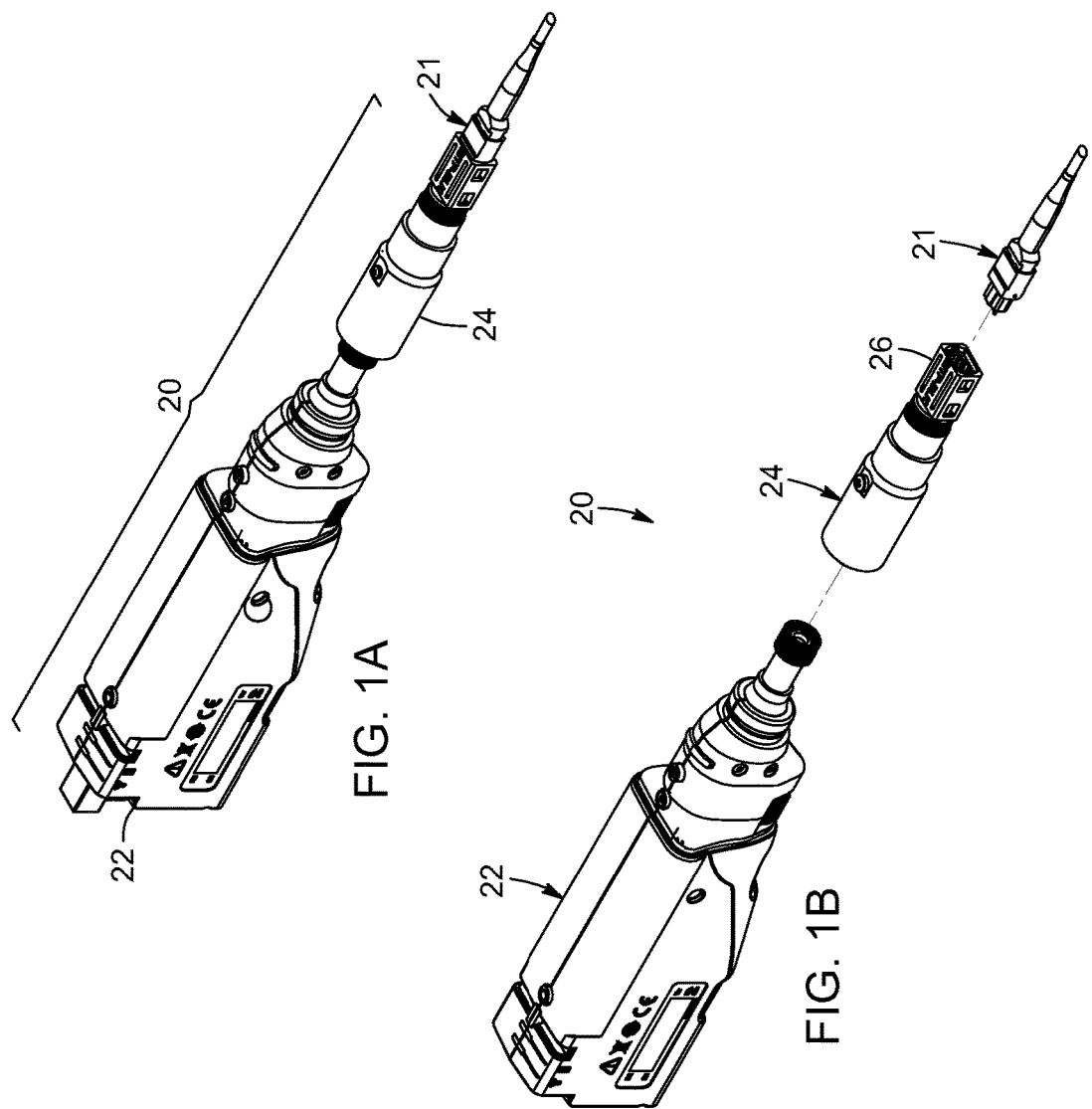

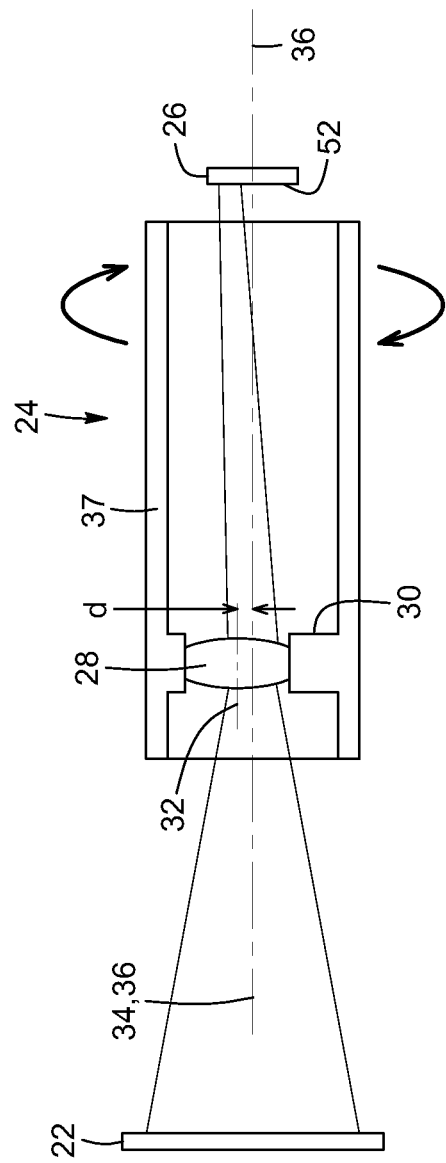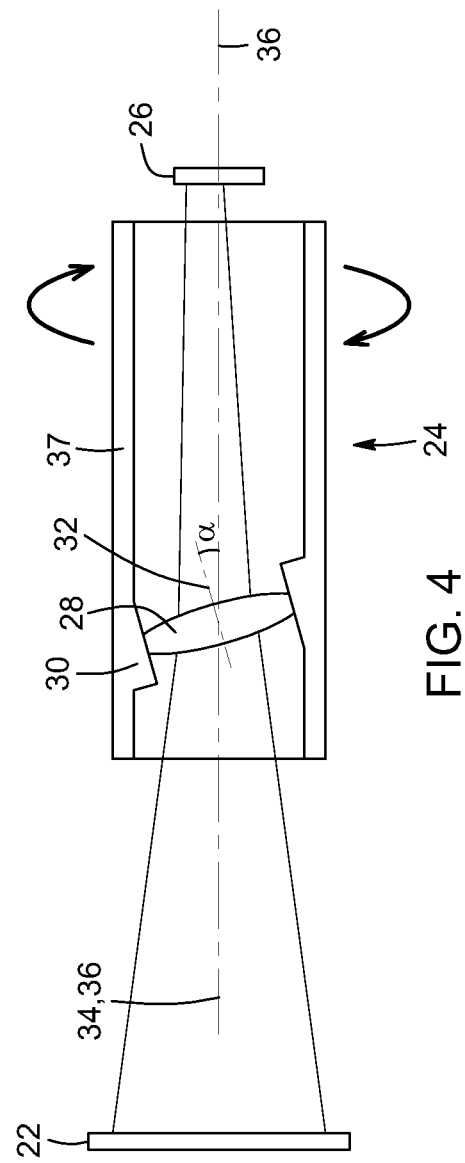

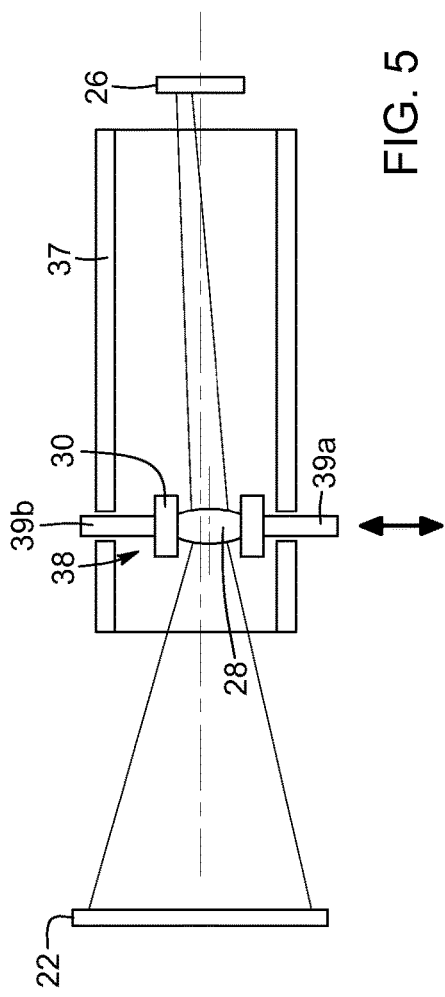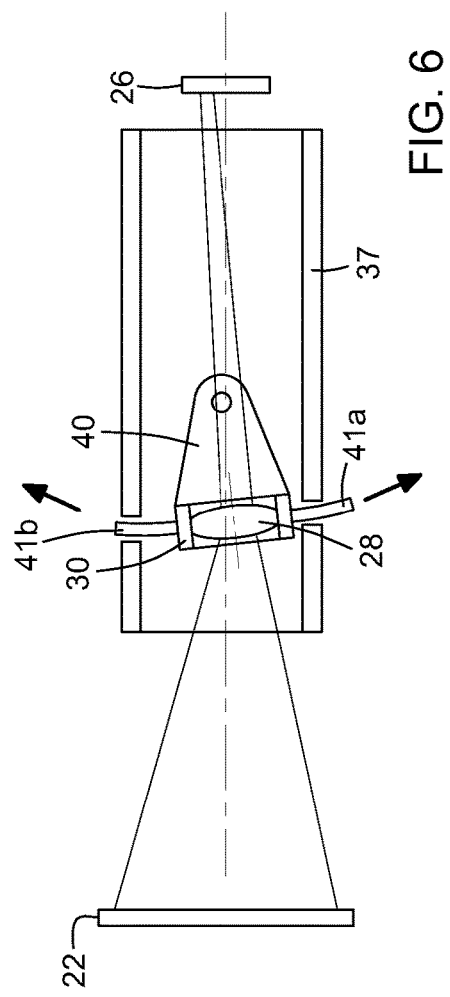

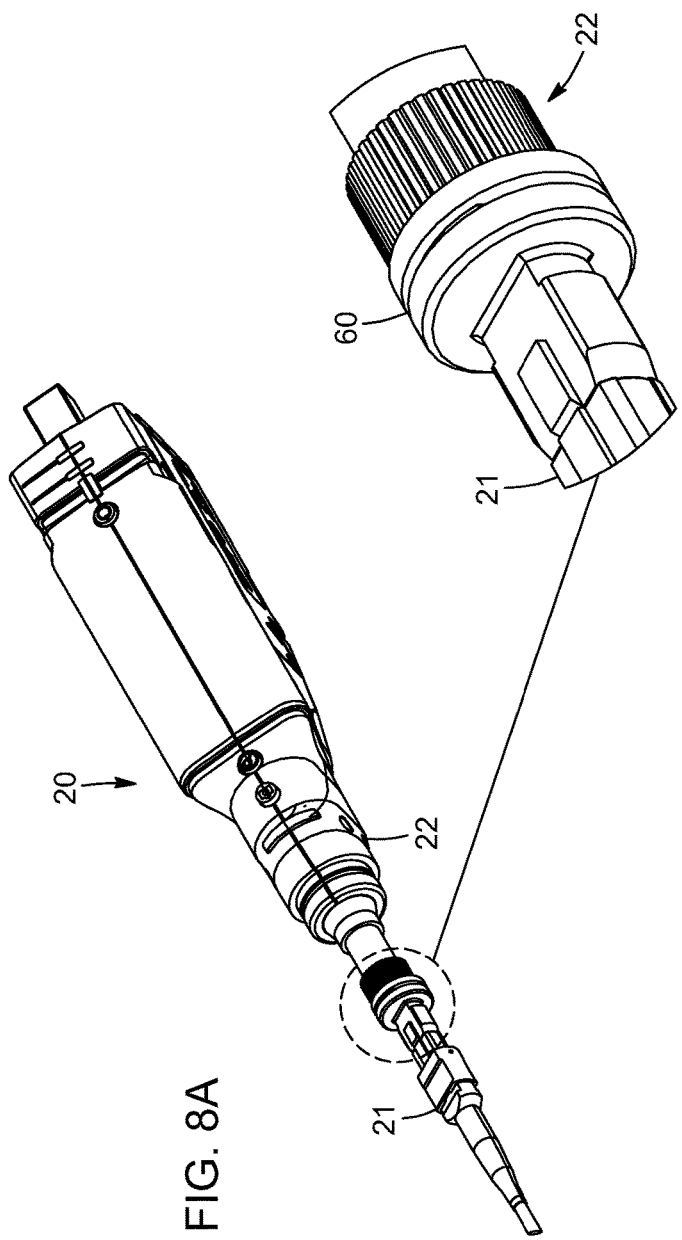
FIG. 8A
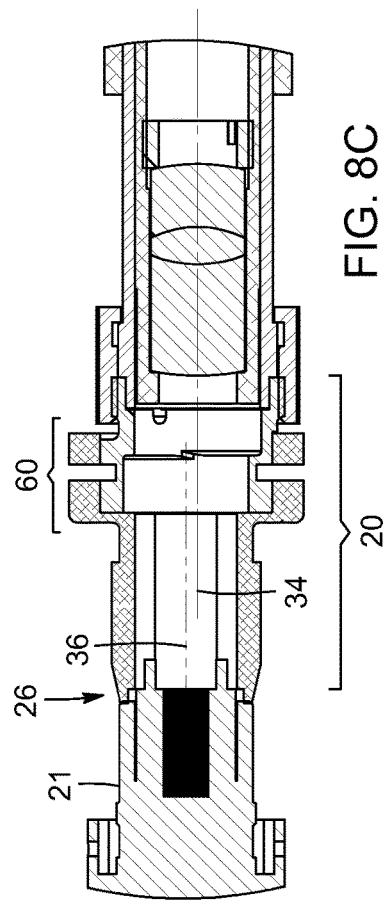
FIG. 8B
FIG. 8C

MULTIPLE-FIBER CONNECTOR INSPECTION

RELATED APPLICATIONS

This application incorporates by reference, in their entirety, and claims priority to U.S. provisional patent application 62/188,247, filed Jul. 2, 2015 and U.S. provisional patent application 62/258,098, filed Nov. 20, 2015.

TECHNICAL FIELD

The technical field generally relates to the inspection of optical-fiber connector endfaces, and more particularly to systems for inspecting multiple-fiber connectors employed in fiber-optic communication networks.

BACKGROUND

The quality and cleanliness of endfaces of optical-fiber connectors represent important factors for achieving adequate system performance of optical communication networks. Indeed, any contamination of or damage on the mating surface of an optical-fiber connector may severely degrade signal integrity. Optical-fiber inspection microscope probes are commonly employed to visually inspect and/or to analyze the optical-fiber endface of an optical-fiber connector at installation or during maintenance of optical communication networks, in order to verify the quality of the optical-fiber connection.

Inspection of multiple-fiber connectors (MFCs), which are commonly used to mate fiber ribbon cables, is particularly challenging since each optical-fiber endface is to be inspected individually.

Some solutions exist to acquire images and inspection information on optical-fiber endfaces in an MFC. Available solutions move the field of view of a microscope probe over the surface the MFC in order to successively observe and inspect each optical fiber endface one after the other. Mechanical means are typically employed to move the microscope probe relative to the MFC in a transverse fashion from one fiber endface to the next. U.S. Pat. No. 6,879,439 (Cassady), U.S. Pat. No. 7,239,788 (Villeneuve) and U.S. Pat. No. 8,104,976 (Zhou et al.) are all examples of solutions relying on such relative mechanical displacement means. These solutions are implemented in an accessory, often termed a "tip". The tip is attached to the inspection microscope probe and provides the relative transverse displacement of the microscope probe with respect to the MFC-under-test, which in turn allows for a selective alignment of any particular optical-fiber endface with the imaging axis of the microscope probe.

A drawback of this approach is that it renders the microscope probe and tip assembly fragile when submitted to shocks and vibrations. Another drawback is that the movement needed for this approach is imprecise due to the mechanical play associated with the moving parts inside the tip, which may lead to uncertainty as to which fiber is inspected. It may sometimes be impossible to reliably identify which fiber endface is currently being inspected, thus resulting in an unreliable inspection, and the need to repeat the process. This may be particularly observed in applications where the MFC-under-test is recessed into a bulkhead adapter that is mounted on a patch panel. In this case, the tip is manually inserted into the bulkhead adapter for inspection of the MFC, which may result in the inadvertent application of a force couple on the tip and an uncontrolled positioning with respect to the fiber endfaces.

Accordingly, there exists a need in the art for providing an improved, more robust, inspection system for inspecting optical-fiber endfaces of MFCs that can alleviate at least some of the above-mentioned drawbacks.

SUMMARY

In accordance with one aspect, there is provided an inspection system for inspecting a multiple-fiber connector comprising an array of optical fiber endfaces over a connector surface, the system comprising:
 a microscope probe having a field of view;
 a probe tip configured to provide an optical path between the microscope probe and the multiple-fiber connector, and comprising a mating interface configured to interface with the multiple-fiber connector, the probe tip and microscope probe being configured so that the field of view of the microscope probe at the mating interface is sufficiently large to cover a portion of the connector surface encompassing a plurality of the optical fiber endfaces; and
 a shifting mechanism operable to shift the field of view of the microscope probe between at least two discrete positions over the connector surface when the mating interface of the probe tip is interfaced with the multiple-fiber connector, each of the at least two discrete positions encompassing a different subset of the multiple optical fiber endfaces In some implementation, one or more of the at least two discrete positions may further encompass at least one positioning reference. The positioning reference may be embodied by a portion of the connector surface adjacent the array of optical fiber endfaces—essentially using the absence of a next optical fiber endface in the array to establish a correspondence between the imaged optical fiber endfaces and their respective positions on the multiple-fiber connector.

In some implementations, the at least two discrete positions may consist of two discrete positions covering respective half portions of the connector surface, or may respectively cover end portions of the connector surface and at least one intermediate portion therebetween. Alternatively, the at least two discrete positions may consist of four discrete positions covering respective quadrant portions of the connector surface.

In some implementations, the shifting mechanism may include an optical element in the optical path between the microscope probe and the multiple-fiber connector, and an optical element support mounted in the probe tip and receiving the optical element therein. The optical support element is movable to move the optical element so as to shift the field of view of the microscope probe between the at least two discrete positions. The optical element support may for example be rotatable between pre-set angular positions about a rotation axis substantially normal to the mating interface. In one embodiment the optical element and optical element support are configured such that an optical axis of said optical element extends parallel to and offset the rotation axis of the optical element support. In another variant the optical element and optical element support are configured such that an optical axis of said optical element forms an angle with the rotation axis of the optical element support. The optical element support may alternatively be slidable transversally to an axis substantially normal to the mating interface, between pre-set locations, or pivotable about an axis in a plane substantially parallel to the mating interface, between pre-set orientations.

In some implementations, the shifting mechanism may further comprise a push-pull mechanism cooperating with the movable support to rotate the same. In one embodiment, the push-pull mechanism includes the following elements:

a rotatable cylindrical housing in which is mounted the at least one optical element, the cylindrical housing having an outer surface provided with a groove defining a path;

an inner sleeve integral with or rigidly affixed to the mating interface of the probe tip and receiving the cylindrical housing therein;

an outer sleeve rigidly connected to the microscope probe and surrounding the inner sleeve, the outer housing having one or more guiding pins projecting inwardly and engaged in the groove of the cylindrical housing, the guiding pin extending through a slit in the inner sleeve; and a resilient element biasing the outer sleeve against the inner sleeve.

In another implementation, the shifting mechanism may include:

a cylindrical housing in which is mounted the at least one element;

an inner sleeve integral with or rigidly affixed to the mating interface of the probe tip, the inner sleeve defining a cavity having a cavity wall and receiving the cylindrical housing therein;

an outer sleeve provided in a sliding engagement over the inner sleeve;

at least one pairs of alignment guides provided transversally through the outer sleeve and the inner sleeve, the alignment guides of each pair being disposed opposite each other and have corresponding extremities projecting inside the cavity equidistantly with respect to the cavity wall;

wherein the cylindrical housing has a profiled outer surface defining matching curved shapes on opposite transversal sides of the cylindrical housing in alignment with each pair of alignment guides.

In yet another implementation, the shifting mechanism may include a swivel coupler allowing a relative rotation between the microscope probe and the multiple-fiber connector.

In some implementations, the inspection system may further include a processor comprising instructions for analyzing imaging data from the microscope probe representative of the subsets of the optical fiber endfaces and obtaining therefrom inspection information related to individual ones of said optical fiber endfaces.

Advantageously, in embodiments of this system the microscope probe registers multiple fiber endfaces at the same time, which limits the movements of components to a discrete number of easily recognizable positions within the probe tip, making the system more robust and less affected by shocks and vibrations. Furthermore, in some implementations the encompassing of a positioning reference in the field of view of the microscope may provide certainty as to which fiber is being inspected, preventing inspection mistakes and unnecessary repetition of the inspection process.

In accordance with another aspect, there is also provided a probe tip connectable to a microscope probe for inspecting a multiple-fiber connector comprising an array of optical fiber endfaces over a connector surface, the microscope probe having a field of view, the probe tip comprising:

a mating interface configured to interface with the multiple-fiber connector, the probe tip being configured so that the field of view of the microscope probe at the mating interface is sufficiently large to cover a portion of the connector surface encompassing a plurality of the optical fiber endfaces; and a shifting mechanism operable to shift the field of view of the microscope probe between at least two discrete positions over the connector surface when the mating interface is interfaced with the multiple-fiber connector, each of the at least two discrete positions encompassing a different subset of the multiple optical fiber endfaces.

In some implementations, one or more of the at least two discrete positions may further encompass at least one positioning reference. The positioning reference may be embodied by a portion of the connector surface adjacent the array of optical fiber endfaces—essentially using the absence of a next optical fiber endface in the array to establish a correspondence between the imaged optical fiber endfaces and their respective positions on the multiple-fiber connector.

In some implementations, the at least two discrete positions may consist of two discrete positions covering respective half portions of the connector surface, or may respectively cover end portions of the connector surface and at least one intermediate portion therebetween. Alternatively, the at least two discrete positions may consist of four discrete positions covering respective quadrant portions of the connector surface.

In accordance with another aspect, there is provided a method for inspecting a multiple-fiber connector comprising an array of optical fiber endfaces over a connector surface, the method including:

providing an inspection system comprising a microscope probe having a field of view and a probe tip configured to provide an optical path between the microscope probe and the multiple-fiber connector;

interfacing a mating interface of the probe tip with the multiple-fiber connector. The field of view of the microscope probe at the mating interface is sufficiently large to cover a portion of the connector surface encompassing a plurality of the optical fiber endfaces; and shifting the field of view of the microscope probe between at least two discrete positions over the connector surface, each of the at least two discrete positions encompassing a different subset of the multiple optical fiber endfaces, one or more of the at least two discrete positions further encompassing at least one positioning reference, and acquiring an image of the connector surface for each of these discrete positions.

In accordance with yet another aspect there is also provided a method for inspecting a multiple-fiber connector comprising an array of optical fiber endfaces over a connector surface, the method comprising:

acquiring an image of a portion of the connector surface of the multiple-fiber connector using an inspection system comprising a microscope probe and having a field of view on the connector surface, the imaged portion being defined by a first discrete position of the field of view of the microscope probe and encompassing a plurality of the optical fiber endfaces;

shifting the field of view of the microscope probe to a second discrete position over the connector surface, each of the first and second discrete positions encompassing a different subset of the multiple optical fiber endfaces; and acquiring an image of another portion of the connector surface of the multiple-fiber connector which is defined by the second discrete position.

In some implementations, at least one of the images may encompass at least one positioning reference.

In some implementations, the method may further involve shifting the field of view to at least one additional discrete position over the connector surface, each additional discrete position encompassing a different subset of the multiple optical fiber endfaces, and acquiring images of portions of the connector surface of the multiple-fiber connector defined by the additional discrete positions.

Other features and advantages of the invention will be better understood upon a reading of embodiments thereof with reference to the appended drawings.

BRIEF DESCRIPTION OF THE DRAWINGS

FIG. 1A is a side elevation view of an inspection system according to one embodiment;

FIG. 1B is an exploded side elevation view of the inspection system of FIG. 1A.

FIG. 3 is a schematized representation of the configuration of a probe tip for an inspection system, including a rotatable lens having an optical axis parallel and offset the imaging axis of the microscope probe.

FIG. 4 is a schematized representation of the configuration of a probe tip for an inspection system, including a rotatable lens having an optical axis forming an angle with the imaging axis of the microscope probe.

FIG. 5 is a schematized representation of the configuration of a probe tip for an inspection system, including a transversally slidable lens.

FIG. 6 is a schematized representation of the configuration of a probe tip for an inspection system, including a lens pivotable about an axis transversal to the imaging axis of the microscope probe.

FIG. 8A is a side elevation view of an inspection system for including a swivel coupling between the microscope probe and the connector surface of a multi-fiber connector;

FIG. 8B is an enlarged view of the swivel coupling of the inspection system of FIG. 8A;

FIG. 8C is a cross-sectional side view of the swivel coupling of FIG. 8B.

DETAILED DESCRIPTION

Figure 2A:
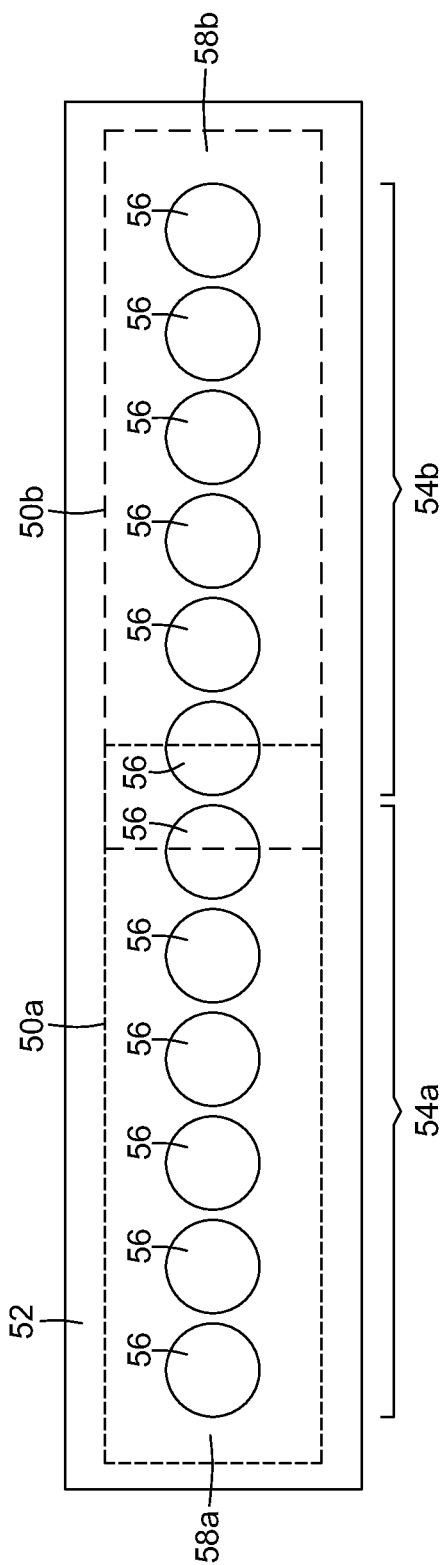
FIG. 2A is schematized representations of a one-dimensional array of optical fiber endfaces of a connector surface of a multi-fiber connector probed over two discrete positions.

In the following description, similar features in the drawings have been given similar reference numerals and, in order to not unduly encumber the figures, some elements may not be indicated on latter figures if they were already identified in prior figures. It should also be understood herein that the elements of the drawings are not necessarily depicted to scale, since emphasis is placed upon clearly illustrating the elements and structures of the present embodiments. Some mechanical and/or optical elements may also be omitted on some or all of the figures in order to emphasize inventive aspects of the illustrated embodiments.

The present specification generally relates to an inspection system for inspecting a multiple-fiber connector, referred to hereinafter as an MFC or connector, as well as to a probe tip and a method for inspecting such an MFC. Optical fiber connectors can be categorized into single-fiber and multiple-fiber connectors, which respectively include the end portion of a single optical fiber and the end portions of multiple optical fibers. As used herein, the end portion of an optical fiber is referred to as a "fiber endface". As such, the MFC therefore includes an array of optical fiber endfaces, which may be a one-dimensional array (defining a single row of optical fiber endfaces) or bi-dimensional (defining a grid of rows and columns of optical fiber endfaces). Any other arbitrary configuration may be considered. As explained above, MFCs are commonly used to mate fiber ribbon cables. The MFC can be attached to a coupling device, such as bulkhead adaptor mounted on a patch panel.

In situ inspection of fiber connectors is relevant to the optimization of optical fiber networks, including data-center optical interconnects. A fiber connector which is clean in accordance with accepted industry standards minimizes optical loss and reflections, thus creating favorable conditions for a network to respect its specifications. Unclean connectors are often a cause of optical-network problems, and hence, in the event of trouble, it is generally desirable that connectors be verified (by way of visual inspection) before other possible sources of impairments.

The conventional approach to inspect the optical-fiber endfaces in an MFC is to acquire an image of each optical fiber endface successively, and process and/or display each individual image to allow the evaluation of the condition of the corresponding optical endface. Images are typically acquired by mechanically moving the MFC-under-test in a transverse fashion relative to the imaging axis of an inspection microscope. This transverse displacement of the MFC may involve a linear or angular motion employing mechanical parts. A drawback of this approach is that, in practice, mechanical parts enabling such a motion are generally associated with a certain degree of mechanical play. Such a mechanical play may translate into a residual uncontrolled movement of the image on the image sensor inside the inspection microscope. It may thus hamper the sequential imaging of the fiber endfaces in the MFC-under-test, and may render uncertain which fiber endface is actually being inspected, since a fiber endface might have been accidentally skipped. In such a case, the user would likely need to re-initiate inspection of the entire MFC, resulting in wasted time.

Broadly described, and as discussed in greater detail below, the inspection system according to the present description includes a microscope probe (also known as an "inspection probe" or "inspection tool") and a probe tip (also known as an "inspection tip") configured to provide an optical path between the microscope probe and the MFC. The probe tip and microscope probe are configured so that the field of view of the microscope probe is sufficiently large to cover a portion of the connector surface encompassing a plurality of the optical fiber endfaces. A shifting mechanism is also provided and is operable to shift the field of view of the microscope probe between at least two discrete positions over the surface of the MFC.

In contrast to existing MFC inspection systems and methods, embodiments of the inspection system, probe tip and method described herein can allow for the inspection of several optical fiber endfaces to be carried out using a same image. Advantageously, this may be carried out by the shifting mechanism operable in conjunction with the probe tip. Implementations of such systems and method can limit the movements in the tip to a discrete number of easily recognizable positions, and allow the microscope probe to register multiple fiber endfaces at the same time. In some implementations, one or more of the discrete positions may provide for the field of view of the microscope probe to encompass a positioning reference for determining which fiber is being inspected, making it virtually impossible to be unsure of which fiber is being inspected. For example, the field of view of the microscope probe can be large enough to register part of the surface of the connector around the array of optical-fiber endfaces, where there is no optical-fiber endface.

The present specification also relates to a probe tip connectable to a microscope probe for inspecting a multiple-fiber connector, as also explained in more details below.

Referring to FIGS. 1A and 1B, an inspection system 20 for inspecting an MFC 21 according to one implementation is shown. The system 20 includes an inspection microscope 22, and a probe tip 24.

The inspection microscope 22 may be embodied by various devices adapted to acquire images of the MFC-under-test, and may include or be associated with a processor provided with suitable algorithms for processing, analyzing and/or displaying such images and evaluate therefrom the condition, cleanliness or other aspect of the optical fiber endfaces. In some implementations, the inspection microscope may be embodied by one of conventional devices used in existing fiber inspection systems, for example the EXFO's FIP-400B series of Fiber Inspection Probes. The inspection microscope includes an imaging sensor which can have a resolution sufficient to provide inspection information on individual fiber endfaces in a subset of the entire array of fiber endfaces of the MFC, without necessarily having the higher resolution required to inspect the entire array of optical fiber endfaces from a single image.

The probe tip 24 is configured to provide an optical path between the microscope probe 22 and the MFC 21. The probe tip 24 includes a mating interface 26 at one of its extremities, configured to interface with the MFC 21. In the illustrated embodiment, the microscope probe 22 and the probe tip 24 are shown as separate devices connectable to each other to define the inspection system 20 when connected. In other variants, the microscope probe 22 and the probe tip 24 may integrally form a single structure, therefore defining a single device. In yet other variants, either or both of the microscope probe or probe tip may be composed of an assembly of different sub-components connected together in use without departing from the scope of the invention.

The probe tip 24 and microscope probe 22 are configured so that the field of view of the microscope probe 22 at the mating interface 26 is sufficiently large to cover a portion of the connector surface encompassing a plurality of the optical fiber endfaces. One skilled in the art will readily understand that the field of view of the microscope probe 22 at the mating interface 26 corresponds to the area of the MFC which is imaged on the imaging sensor of the microscope probe 22, and that this field of view depends on both the construction of the microscope probe 22, and on any optical component in the optical path between the mating interface and the microscope probe.

The inspection system 20 also includes a shifting mechanism, provided in or in association with the probe tip 24.

Figure 2B:
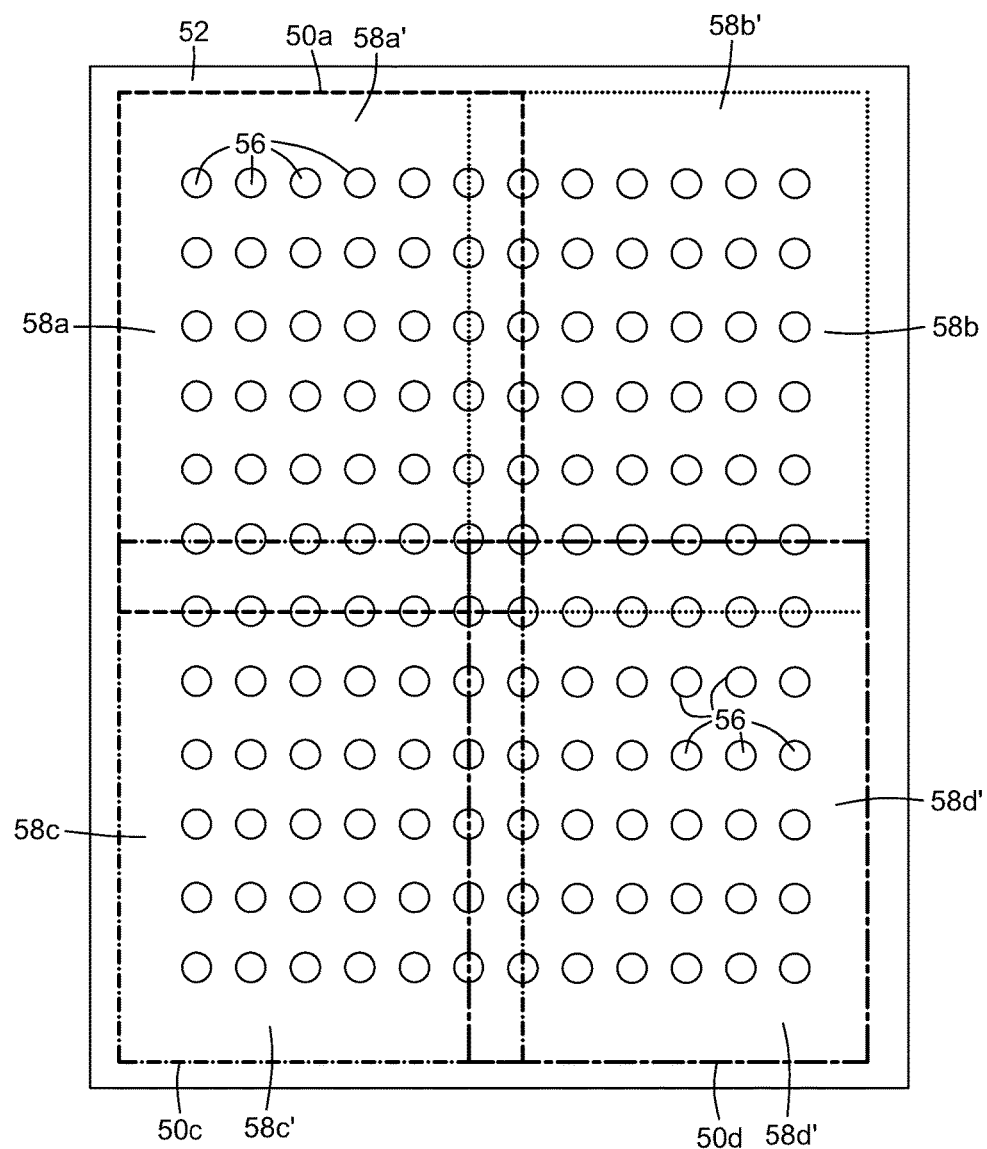
FIG. 2B is schematized representations of a bi-dimensional array of optical fiber endfaces of a connector surface of a multi-fiber connector probed over four discrete positions.
Figure 2C:
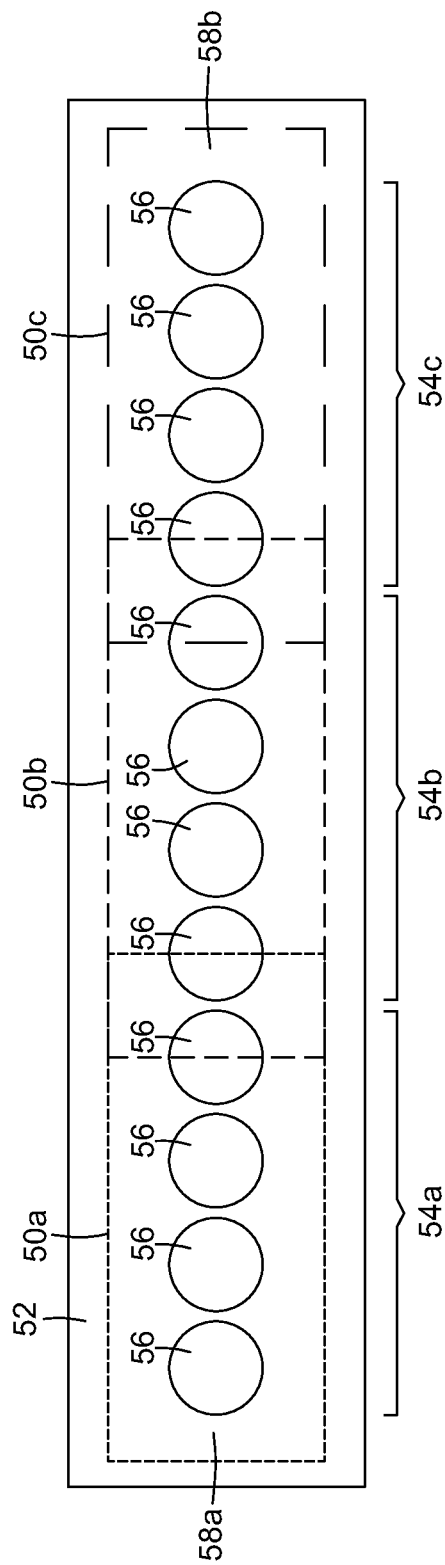
FIG. 2C is schematized representations of a one-dimensional array of optical fiber endfaces of a connector surface of a multi-fiber connector probed over three discrete positions.

With reference to FIGS. 2A, 2B and 2C, the shifting mechanism is operable to shift the field of view of the microscope probe between at least two discrete positions over the connector surface 52 when the mating interface of the probe tip is interfaced with the MFC. Each discrete position encompasses a different subset of the multiple optical fiber endfaces 56 In the example of FIG. 2A, two discrete positions 50a, 50b covering respective half portions of the connector surface 52 are illustrated, each discrete position 50a, 50b encompassing a respective subset 54a, 54b of the multiple optical fiber endfaces 56. FIG. 2B shows the shifting of the field of view between four discrete positions 50a, 50b, 50c and 50d covering respective quadrant portions of the connector surface 52 according to another example. The two-dimensional array of optical fiber endfaces 56 within each quadrant portion of the connector surface therefore define the corresponding subset of the multiple optical fiber endfaces. In the example of FIG. 2C, the at least two discrete positions respectively cover two end portions of the connector surface (covered by discrete positions 50a and 50c) and one intermediate portion therebetween (covered by discrete position 50b).

The expression "discrete positions" is understood to refer to predetermined mechanical settings of the shifting mechanism allowing the field of view of the microscope probe to be shifted to only a limited number of well-defined positions over the connector surface. The shifting mechanism is therefore configured such that the discrete positions are clearly and repeatably achieved through normal operation of the system. Preferably the configuration of the shifting mechanism is such that an operator readily knows that one of the pre-set discrete position has been reached. Examples of suitable shifting mechanisms are provided further below.

In some embodiments, one or more of the at least two discrete positions further encompass at least one positioning reference. The positioning reference may for example be a portion of the connector surface adjacent the array of optical fiber endfaces. Therefore, the absence of a next optical fiber endface adjacent the endmost fiber endface of the array can be used to delimit the extent of the array of optical fiber endfaces, and properly identify the position of each fiber endface 56 being inspected. For example, when the fiber endfaces form a one-dimensional array covered by two discrete positions of the field of view of the microscope such as shown in FIG. 2A, the positioning reference may be a portion 58a, 58b of the connector surface 52 adjacent the array of optical fiber endfaces 56 along the longitudinal axis of the array. In the case of a two-dimensional array, such as for example shown in FIG. 2B, portions 58a, 58a', ..., 58d, 58*d'* of the connector surface 52 adjacent the array along each of its axis may be recognized.

In some implementations, the inspection system may include a processor comprising instructions, such as an algorithm, for analyzing imaging data from the microscope probe representative of the subsets of the optical fiber endfaces. Inspection information related to individual ones of the optical fiber endfaces is therefore obtained. Knowing the expected distance between adjacent endfaces, the algorithm may recognize the first or last optical-fiber endface on the acquired images. For example, the processor may analyze a region of the acquired images where there is no adjacent optical-fiber endfaces. Because such a region is normally available for all steps, the "missing" optical-fiber endface provides a reference to identify which fiber is being inspected, making it virtually impossible to be unsure of which fiber is being inspected. In other implementations, structures, markings or other identifiable features which are known to be part of the connector surface neighboring the array of optical fiber endfaces may be used as the positioning reference without departing from the scope of the invention. In some variants the presence of surface defects or other random features on the images acquired at two neighboring discrete positions may be used to identify the relative position of nearby optical fiber endfaces. Alternatively, the algorithm may make a count of the number of optical endfaces forming a row as identified in the image obtained for a given discrete position of the field of view, and assign a sequential number to each of these endfaces.

In some variants, the use of a positioning reference may not be required for at least one of the available discrete positions. For example, in some instances the algorithm may use information about the known relative separation between consecutive discrete positions to identify the covered optical fiber endfaces. Using the embodiment of FIG. 2C by way of example, in one implementation the algorithm may identify the optical fiber endfaces of subset 54*a* using the positioning reference 58*a*, then identify the fibers of subsets 54*b* and 54*c* by knowing the exact distance travelled by the field of view of the microscope probe over the connector surface each time the shifting mechanism is activated.

In some implementations, as explained above, the at least two discrete positions may cover respective half portions of the connector surface 52. It will be understood that in such a case, there may be an overlap between the covered portions, as is the case with portions 58*a*, 58*b* in FIG. 2A and portions 58*a*, 58*a'*, . . . , 58*d*, 58*d'* in FIG. 2B. For example, the images corresponding to the two such discrete positions may respectively, and alternately, represent the right and the left portions of the MFC. The missing optical-fiber endface also allows recognizing which portion, left or right, of the MFC is being imaged. If the missing endface appears on the left side of the image, it is the left side of the MFC that is imaged and if the missing endface appears on the right side of the image, it is the right side of the MFC that is imaged. There may also be some overlap between the regions covered by the respective images acquired at each position in implementations where the at least two discrete positions consist of four discrete positions covering respective quadrant portions of the connector surface, such as shown in FIG. 2B.

The shifting mechanism may be embodied by any assembly or arrangement of optical and/or mechanical components apt to shift the field of view of the microscope probe between different the at least two discrete positions over the connector surface. Various implementations of shifting mechanisms according to non-limitative embodiments are described below. It will however be readily understood that the embodiments of shifting mechanisms shown and described herein are provided by way of example only and that a variety of other mechanisms may be used.

In some embodiments, the shift of the field of view is achieved by employing one or more movable optical elements positioned in the optical path between the microscope probe and the multiple-fiber connector. The optical element may be received in an optical element support mounted in the probe tip and itself movable to move the optical element so as to shift the field of view of the microscope probe between the discrete positions.

The shifting of the field of view may be operated through a variety of configurations. In one set of examples, the optical element support may be rotatable about a rotation axis between pre-set angular positions about a rotation axis substantially normal to the mating interface, and therefore to the connector surface. The optical element may be disposed asymmetrically relative to the rotation axis, such that rotating this asymmetric element will move the field of view of the microscope probe over the connector surface.

Referring to FIGS. 3 and 4, examples of such configurations are shown where the at least one optical element is embodied by a lens 28, mounted in the probe tip 24 and disposed in the optical path between the microscope probe and the multiple-fiber connector. Although the embodiments described herein use a single lens as the at least one optical element, it will be readily understood that in other variants the optical element or elements may for example be embodied by one or more lenses, prisms, mirrors, or arrangement of such components. An optical element support, referred herein as a lens support 30, is mounted in the probe tip 24 and receives the lens 28. The lens support 30 is movable to move the lens 28 so as to shift the field of view of the microscope probe 22 (represented as an imaging plane in FIGS. 3 and 4) between the at least two discrete positions.

In a first embodiment (see FIG. 3), the lens 28 is disposed in the lens support 30 such that the optical axis 32 of the lens 28 extends parallel to and offset the rotation axis 36 of the lens support 30. The imaging axis 34 of the microscope probe prior to the lens 28 substantially coincides with the rotation axis 36 of the lens support. The rotation axis 36 is therefore substantially normal to the connector surface 52 and offset relative to the optical axis 32 of the lens 28. The lens support 30 is rotatable between pre-set angular positions about the rotation axis 36. For example, the lens support 30 may be rotatable with angular steps of 180 degrees, thereby defining two possible discrete positions for the lens 28. Accordingly, for each rotation step, the optical axis of the lens 28 is shifted from one side of the rotation axis 26 to the opposite side. The displacement of the lens 28 in this variant therefore shifts the imaging axis of the microscope probe so as to alternately image the right and left portions of the MFC.

Referring to FIG. 4, in a second embodiment, the lens 28 and lens support 30 are configured such that the optical axis 32 of the lens 28 forms an angle α with the rotation axis 36 of the lens support 30. As with the embodiment of FIG. 3, the lens support 30 is rotatable between pre-set angular positions about the rotation axis 36. For example, the lens support 30 may be rotatable with angular steps of 180 degrees, thereby again defining two possible discrete positions for the lens 28. Accordingly, for each rotation step, the angle of the lens 28 is shifted from one side of the rotation axis to the other.

It will be understood that the movements in the embodiments of FIGS. 3 and 4 are not limited to two positions. For example, the steps could be made to be of 90 degrees so as to define four different positions for the lens.

Referring to FIG. 5, in a third embodiment, the optical element comprises a lens 28 mounted on a lens support 30 and having its optical axis 32 substantially parallel to the imaging axis 34 of the microscope probe. The lens support can slide the lens transversally to an axis substantially normal to the mating interface between two or more pre-set locations. The transverse displacement of the lens 28 shifts the imaging axis of the microscope probe so as to move it across the MFC. The transversal movement of the lens 28 may be achieved by actuating a slider 38 in a plane parallel to the mating interface, and therefore to the connector surface. If needed, the movements can be in two orthogonal directions to allow movements of the imaging axis from left to right and top to bottom of the MFC.

Referring to FIG. 6, in a fourth embodiment, the optical element comprises a lens 28 mounted on a lens support 30 pivotable about an axis in a plane substantially parallel to the mating interface, between pre-set orientations. In this matter, the lens 28 is tilted by the pivoting of the lens support. The tilt of the lens 28 shifts the imaging axis of the microscope probe so as to move it across the MFC. If needed, there may be two orthogonal pivot axes to allow movements of the imaging axis from left to right and top to bottom of the MFC.

Actuation of the shifting mechanism by an operator of the inspection system can also be achieved in a variety of manner. By way of example, in the embodiments of FIGS. 3 and 4 the lens support 30 is shown integral to or rigidly affixed to a housing 37 of the probe tip, which can be rotated manually or through interaction with an actuation mechanism. Examples of actuation mechanisms for rotating the lens support 30 are described in more details below. In the embodiment of FIG. 5, the lens support 30 is mounted in a slider 38, and the transversal movement of the lens 28 may be achieved by actuating the slider 38 in a plane parallel to the mating interface 26, and therefore to the connector surface 56. In one embodiment, the slider 38 may be provided with activation pins 39a, 39b alternately protruding through holes in the tip housing 37. In a first position of the slider 38, which corresponds to one pre-set location of the lens 28, a first activation pin 39a protrudes. The slider 38 may be manually activated by the operator of the microscope probe by pressing on the protruding activation pin 39a such that the slider 38 moves in a second position that corresponds to another pre-set location of the lens 28 and for which the second activation pin 39b protrudes and may be activated in a similar fashion. Similarly, in the embodiment of FIG. 6 the lens support 30 is integral to or attached to a pivoting mount 40 which tilts the lens 28 between two or more positions. In one embodiment, the pivoting mount 40 also has activation pins 41a, 41b alternately protruding through holes in the tip housing 37 to allow manually activation of the pivoting mount by the operator of the microscope probe.

Figure 7A:
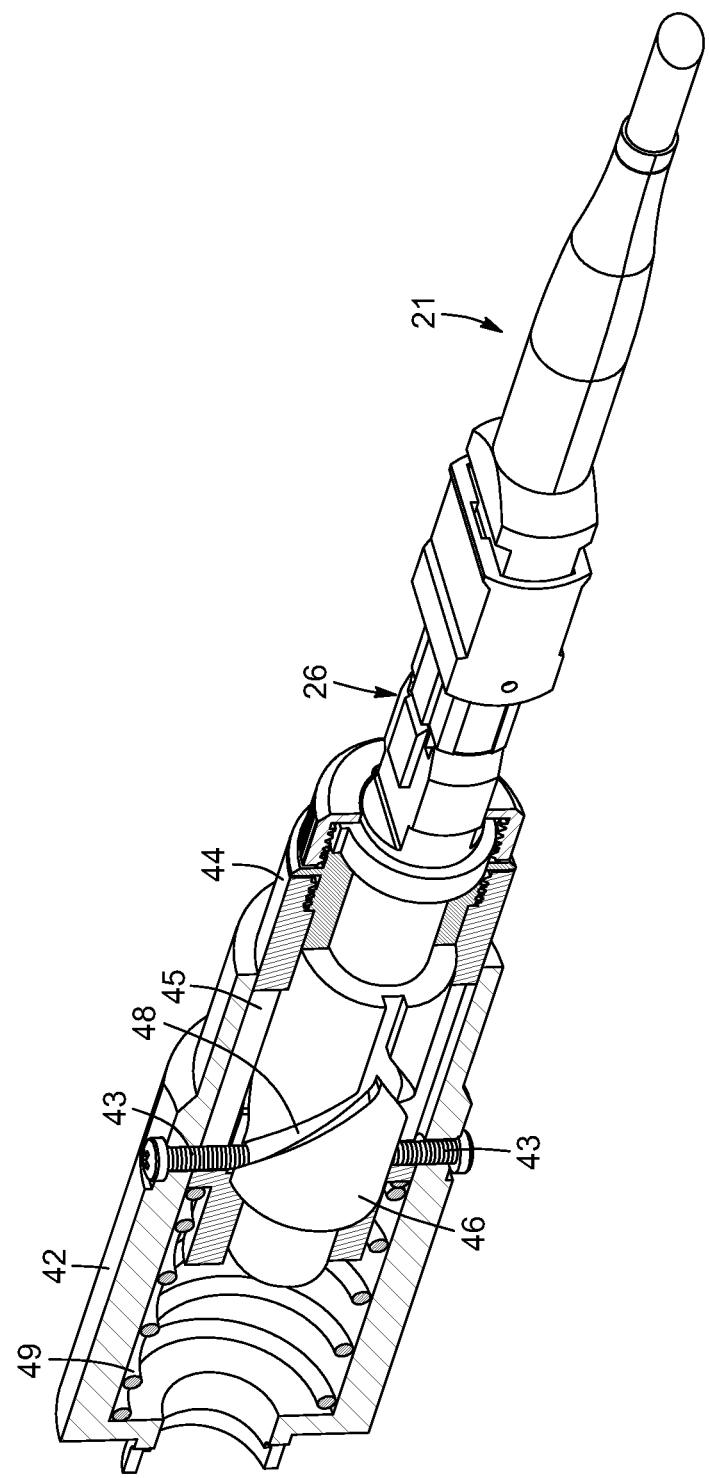
FIGS. 7A and 7B are side elevation view in partial transparency of a probe tip for an inspection system including a push-pull mechanism for shifting the field of view of the microscope probe.
Figure 7B:
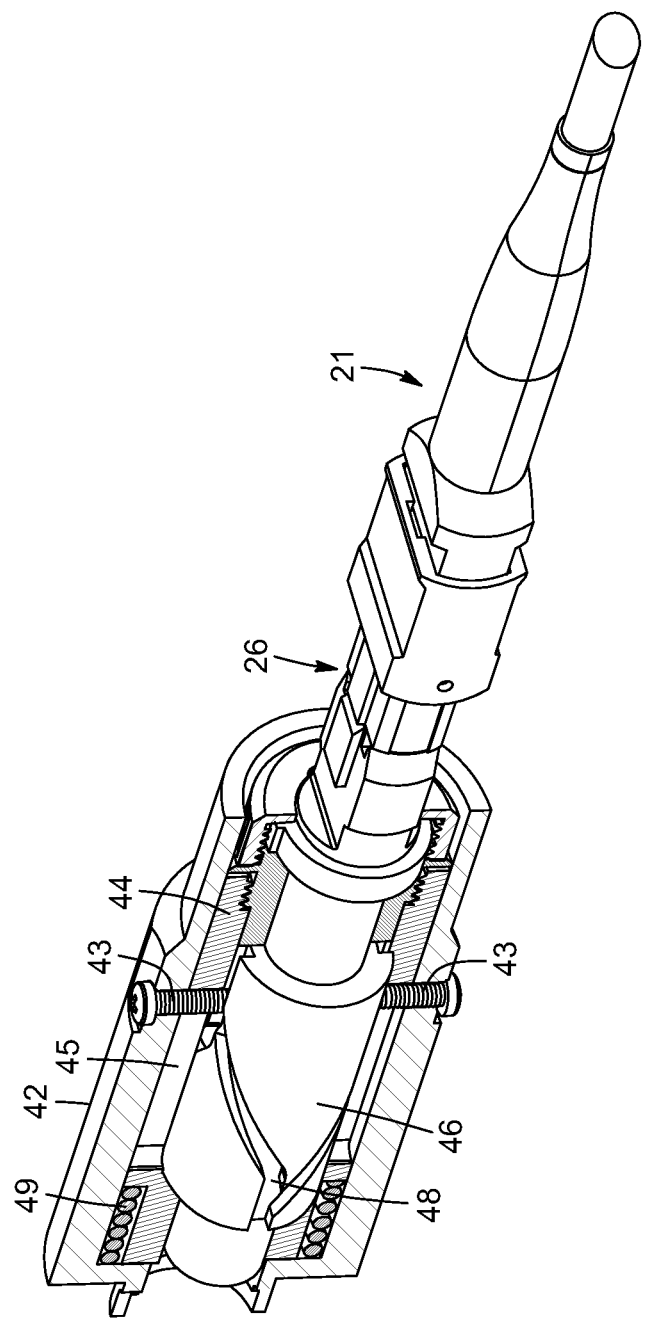
Figure 7C:
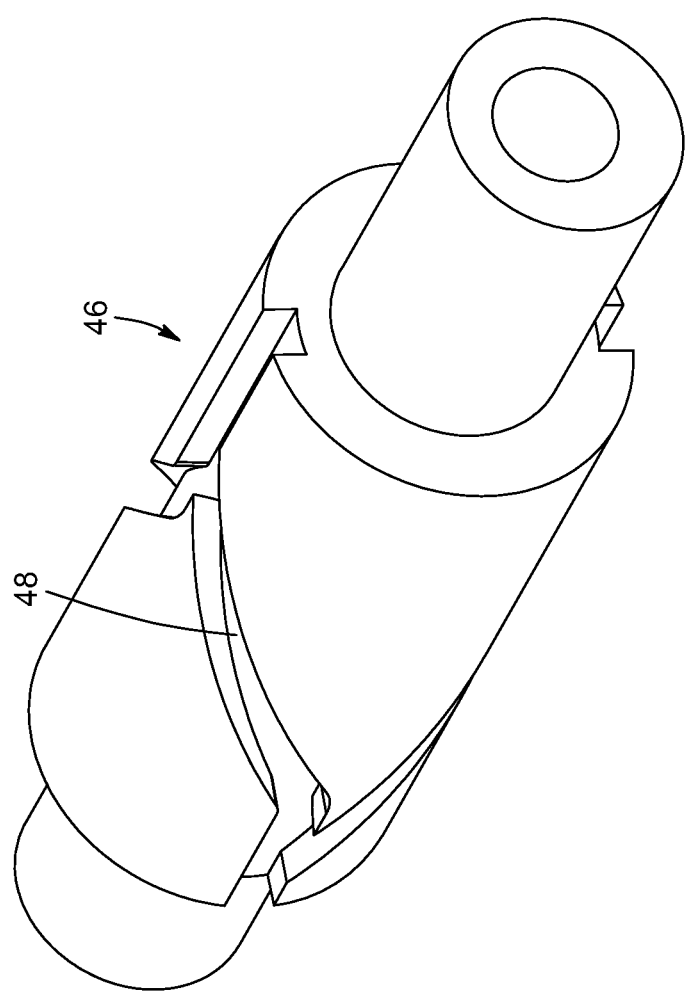
FIG. 7C is a side elevation close-up view of a cylindrical housing for use in the probe tip of FIGS. 7A and 7B.

With reference to FIGS. 7A, 7B and 7C, there is shown one implementation where the shifting mechanism includes a push-pull mechanism cooperating with the movable support to rotate the same. In this variant, the field of view of the microscope probe can be shifted between the discrete positions over the connector surface by an operator through a pushing movement along an axis normal to the connector surface. This may be achieved by pushing the microscope probe 22 toward the inspected MFC, or pushing the inspected MFC toward the microscope probe 22.

Referring to FIGS. 7A and 7B, in one example the push-pull mechanism may include an outer sleeve 42 rigidly connected to the microscope probe 22 and an inner sleeve 44 integral with or rigidly affixed to the mating interface 26 of the probe tip 24 and remaining fixed with respect to the MFC 21. The probe tip includes a rotatable cylindrical housing 46 defining a cavity in which is mounted the at least one optical element (not shown in FIGS. 7A, 7B and 7C). The cylindrical housing 46 has an outer surface provided with a groove 48 defining a path. The outer sleeve 42 has one or more guiding pins 43 projecting inwardly and engaged in the groove 48 of the cylindrical housing 46 (a pair or guiding pins 43 on opposite sides of the cylindrical housing are shown in FIGS. 7A and 7B). Each guiding pin 43 extends through a slit 45 in the inner sleeve 44. The push-pull mechanism may be spring-loaded through a spring 49 or other resilient element biasing the outer sleeve 42 against the inner sleeve so that the outer sleeve 42 is at rest in a back position (shown in FIG. 7A) away from the MFC 21 when no external force is applied. Rotation of the optical element is therefore obtained by manually pushing the probe forwardly, which causes the outer sleeve 42 to slide longitudinally (in a push-pull action) towards a front position (shown in FIG. 7B). Once the operator ceases to apply the external force, the outer sleeve slides towards the back position under the biasing effect of the spring 49. Throughout this "push-pull" movement of the outer sleeve 42 along the inner sleeve 44, the movement of the guiding pins 43 within the groove 48 causes the rotation of the cylindrical housing 46 according to the path defined by the groove.

Of course, the push-pull mechanism may be embodied by different mechanical components in accordance with other variants. It is noted that in another variant, the microscope probe 22, the inner sleeve 44 and the connector interface 26 may be connected together rigidly whereas the outer sleeve 42 is allowed to slide between front and back positions to cause a rotation of the cylindrical housing 46 within the inner sleeve 44. Although in the example above the push-pull mechanism is designed to rotate the optical element between two pre-set positions in 180 degrees steps, it will be readily understood that in other variants a similar mechanism may be built so as to provide for pre-set positions at 90 degrees without departing from the scope of the present description. In other implementations, the rotation of the optical element can be actuated by other means, such as a ratchet mechanism.

Referring to FIGS. 8A, 8B and 8C, in yet another example the shifting mechanism may include a swivel coupler 60 in the probe tip 20 allowing a relative rotation between the microscope probe 22 and the MFC 21. As best seen in FIG. 8C, in one implementation the swivel coupler 60 allowing the connector 21 to rotate about a rotation axis 36 that is offset relative to the imaging axis 34 of the microscope probe. In this embodiment, no optical element is required in the probe tip as the entire microscope probe is rotated relative to the connector 21 to operate the desired change in the intersection of the field of view of the microscope probe 22 with the connector surface. Notches and pins on the swivel coupler (not shown) may provide pre-set positions at 180 degrees from each other, thereby providing the two discrete positions of the field of view of the microscope probe. One pre-set position allows imaging one half of the connector.

A 180-degree rotation of the connector (or the probe) moves the field of view of the probe to the other half of the connector, thanks to the offset rotation axis. In other variants, quadrant portions of the connector surface may be covered by providing for a 90-degree relative rotation between the MFC 21 and the microscope probe.

Figure 9A:
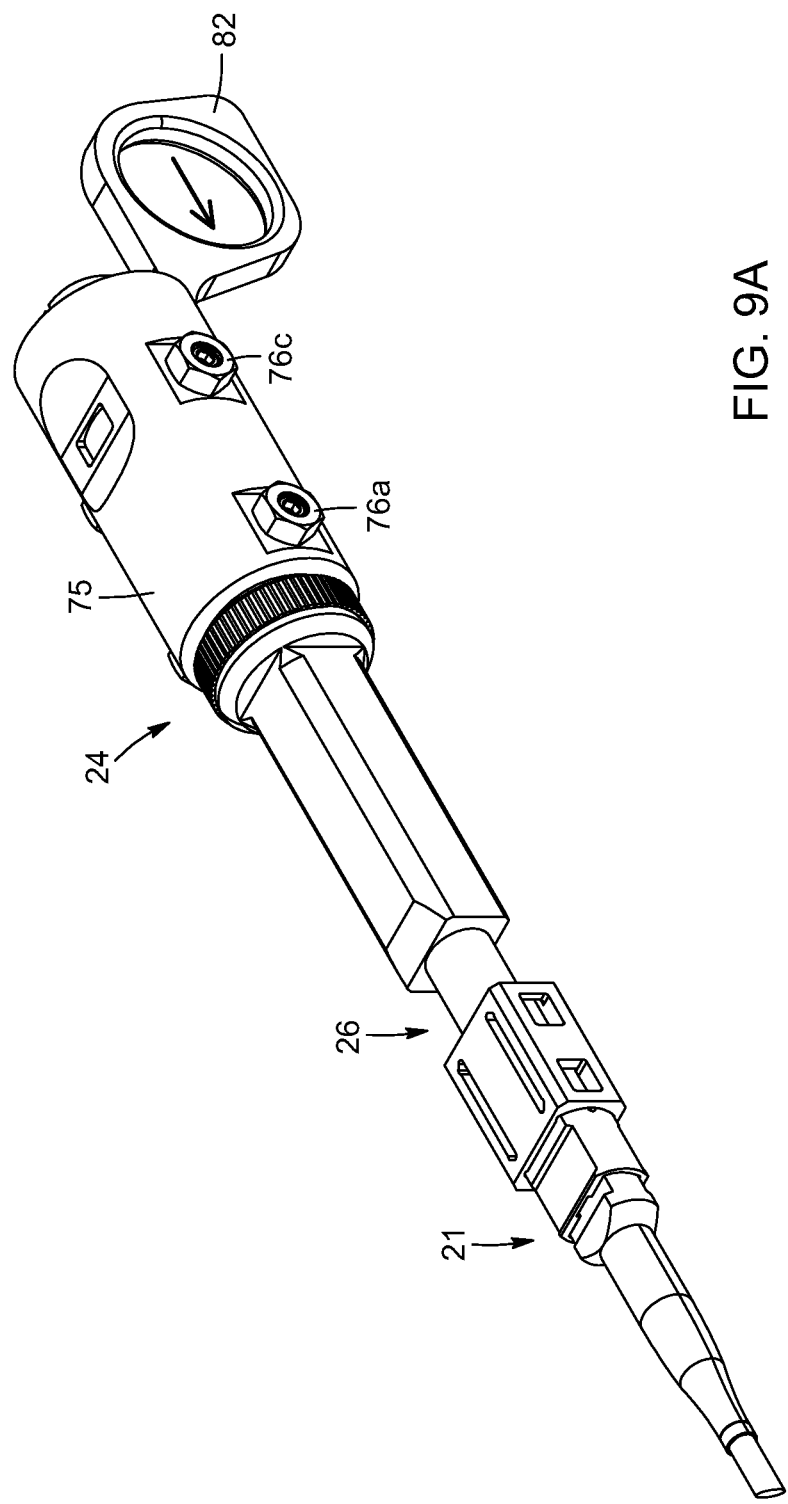
FIG. 9A is a side elevation view of a probe tip connected to a connector surface of a multi-fiber connector and incorporating a sliding trigger mechanism, in the forward position.
Figure 9B:
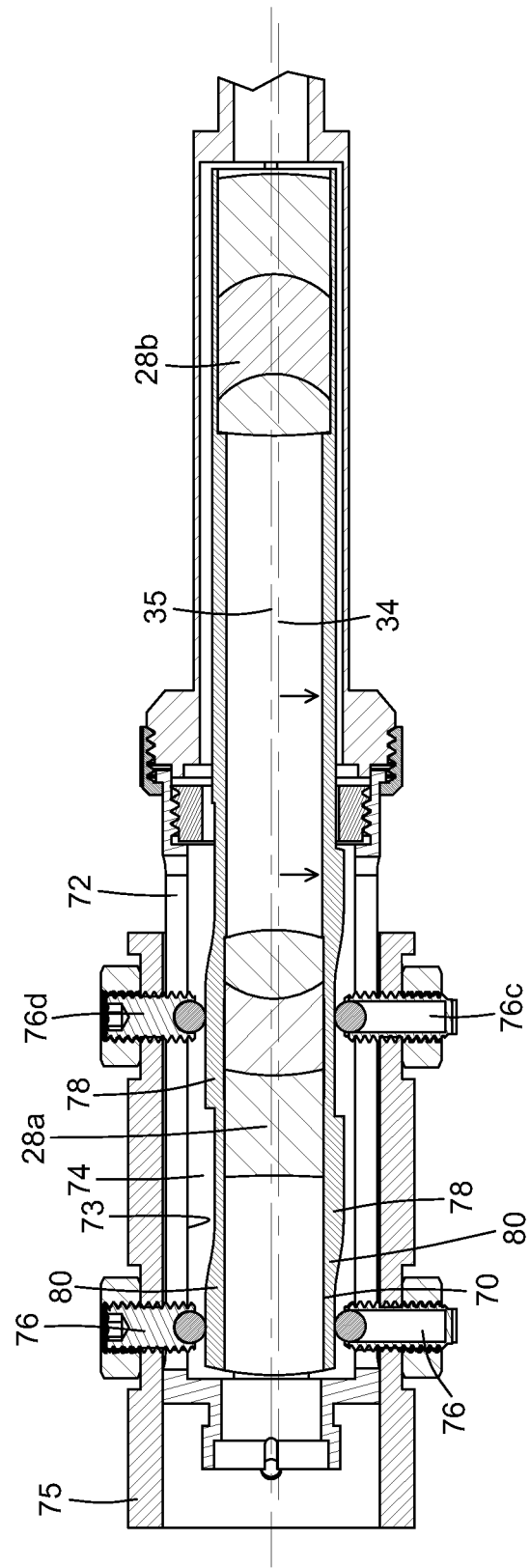
FIG. 9B is a cross sectional top view of the probe tip of FIG. 9A.
Figure 10A:
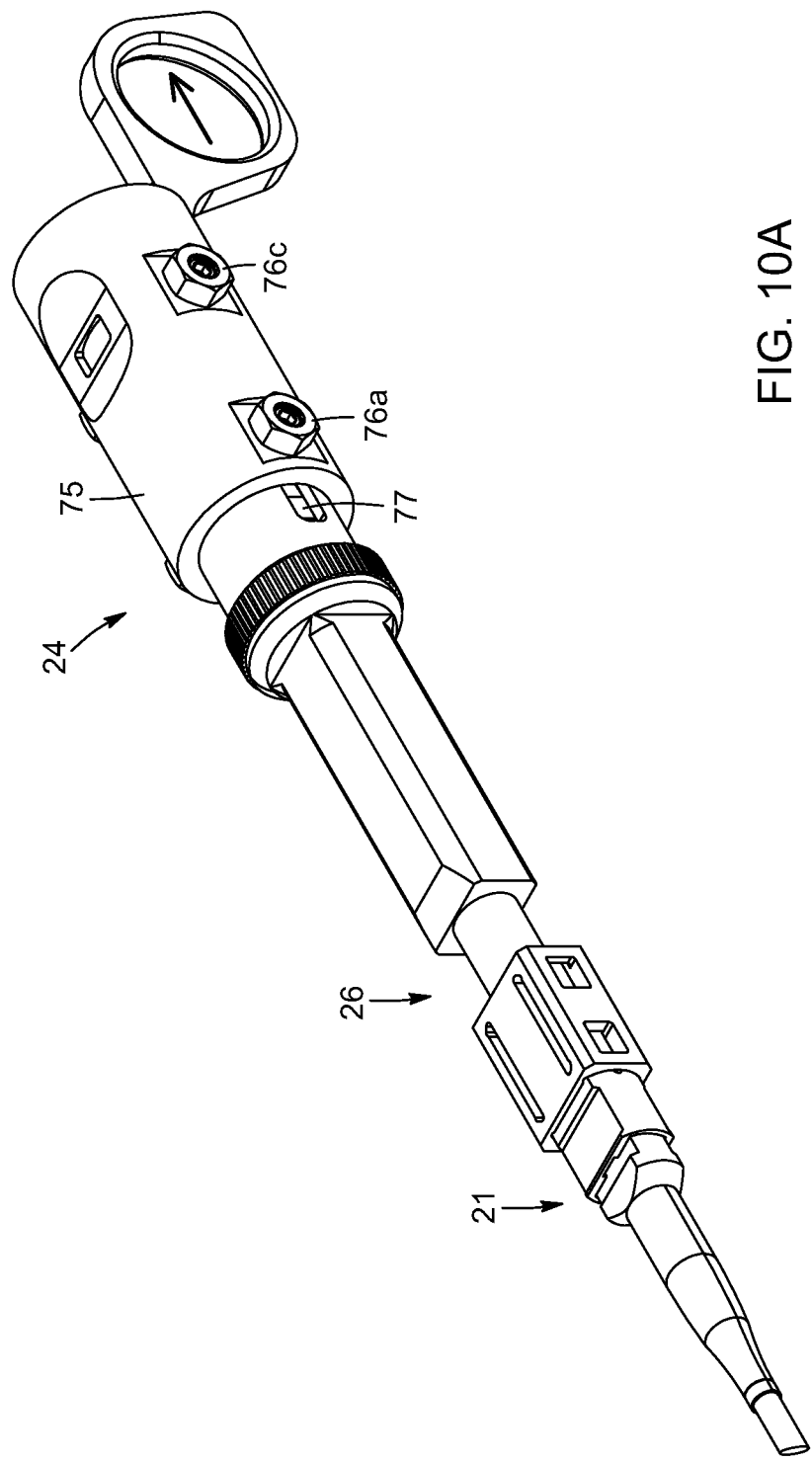
FIG. 10A is a side elevation view of a probe tip connected to a connector surface of a multi-fiber connector and incorporating a sliding trigger mechanism, in the rearward position.
Figure 10B:
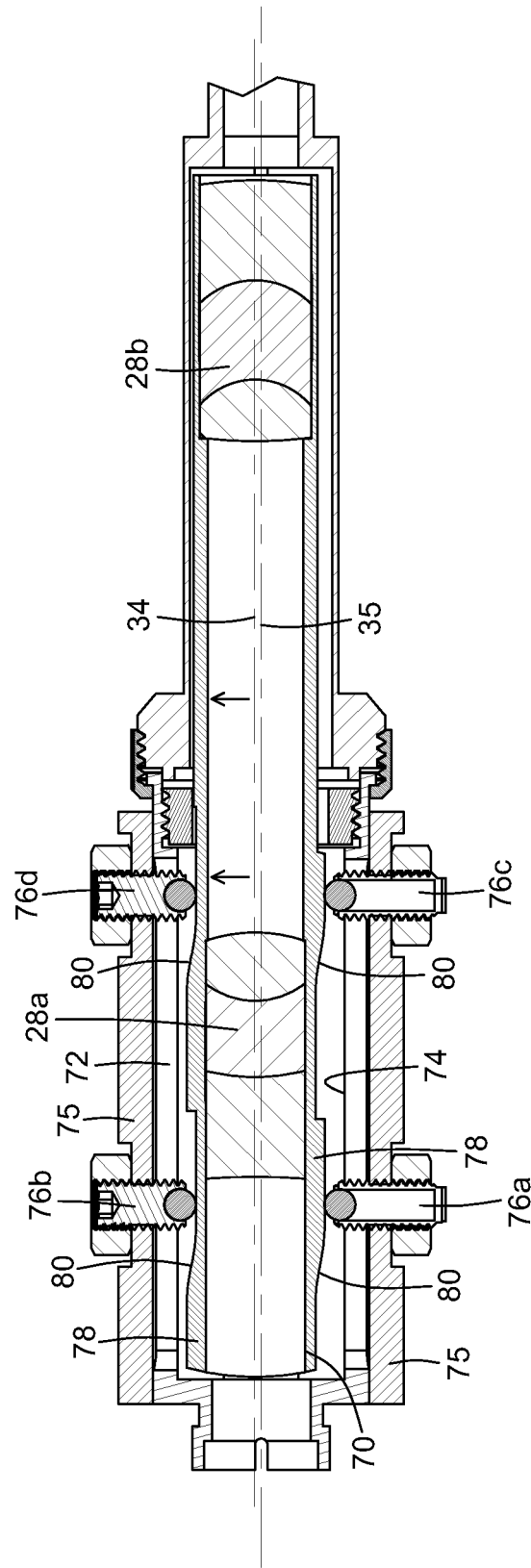
FIG. 10B is a cross sectional top view of the probe tip of FIG. 10A.

Various actuating mechanisms providing for a transversal displacement or a pivoting of a lens or other optical element or elements may also be envisioned. Referring to FIGS. 9A, 9B, 10A and 10B an example of a sliding trigger mechanism for translating optical elements (according to a principle similar to that shown in FIG. 5) is illustrated. In this embodiment, the probe tip 24 includes a cylindrical housing 70 in which are mounted a pair of optical elements 28a, 28b. The probe tip further includes an inner sleeve 72 defining a cavity 74 having a cavity wall 73. The inner sleeve 72 is integral with or rigidly affixed to the mating interface 26 of the probe tip 24 and remaining fixed with respect to the MFC 21. An outer sleeve 75 is provided in a sliding engagement over the inner sleeve 72. Two pairs of alignment guides such as alignment screws 76a, 76b, and 76c, 76d are provided transversally through the outer sleeve 75, and extend through corresponding longitudinal slots 77 provided through the inner sleeve 72. The alignment screws of each pair are disposed opposite each other and have corresponding extremities projecting inside the cavity 74 equidistantly with respect to the cavity wall 73. The cylindrical housing 70 is received within the cavity 74 of the inner sleeve 72. The cylindrical housing 70 has a profiled outer surface 78 defining matching curved shapes 80 on opposite transversal sides of the cylindrical housing 70 in alignment with each pair of alignment screws 76a, 76b, and 76c, 76d. In use, the outer sleeve 75 slides longitudinally over the inner sleeve 72, for example by pulling or pushing on a trigger 82 rigidly affixed to the outer sleeve 75. As shown in FIGS. 9A and 9B, when the outer sleeve 75 is pushed forward towards the MCF, the extremities of the alignment screws 76a, 76b, and 76c, 76d abut on the front portion of the curved shapes 80, which biases the cylindrical housing 70 towards the left side of the cavity 74 (from the perspective of the operator pushing on the trigger 82). This therefore offsets the imaging axis 34 of the microscope probe towards the left with respect to the central axis 35 of the inner sleeve 72, moving the field of view of the microscope probe to the left side of the MFC. Similarly, as shown in FIGS. 10A and 10B, when the outer sleeve 75 is pulled backwards away from the MFC, the extremities of the alignment screws 76a, 76b, and 76c, 76d abut on the rear portion of the curved shapes 80, which biases the cylindrical housing 70 towards the right side of the cavity 74. This therefore offsets the imaging axis 34 of the microscope probe towards the right with respect to the central axis 35 of the inner sleeve, moving the field of view of the microscope probe to the right side of the MFC. In other variants, the sliding trigger mechanism may be designed to move the field of view of the microscope probe longitudinally over three different positions or more over the connector surface.

In some implementations, a probe tip may be provided separately from the microscope probe. In such cases, the probe tip is therefore connectable to a microscope probe for inspecting a multiple-fiber connector comprising an array of optical fiber endfaces over a connector surface. The probe tip of such an implementation may include a mating interface configured to interface with the multiple-fiber connector, and may be configured so that the field of view of the microscope probe at the mating interface is sufficiently large to cover a portion of the connector surface encompassing a plurality of the optical fiber endfaces. The probe tip according to such implementation also includes a shifting mechanism operable to shift the field of view of the microscope probe between at least two discrete positions over the connector surface when the mating interface is interfaced with the multiple-fiber connector. As explained above, each of the at least two discrete positions encompass a different subset of the multiple optical fiber endfaces and may further encompass at least one positioning reference. The positioning reference may optionally be a portion of the connector surface adjacent the array of optical fiber endfaces. In some implementations the at least two discrete positions consist of two discrete positions covering respective half portions of the connector surface, whereas in other implementations the at least two discrete positions may consist of four discrete positions covering respective quadrant portions of the connector surface. In some variants the at least two discrete positions may respectively cover end portions of the connector surface and at least one intermediate portion therebetween. It will be readily understood that such a probe tip may include any of the components and configurations described above.

In accordance with another aspect, there is also provided a method for inspecting a multiple-fiber connector comprising an array of optical fiber endfaces over a connector surface.

The method first includes acquiring an image of a portion of the connector surface of the multiple-fiber connector using an inspection system comprising a microscope probe and having a field of view on the connector surface. The inspection system may for example be embodied by any of the variants, embodiments and implementations of inspection systems described above or equivalents thereof. The imaged portion is defined by a first discrete position of the field of view of the microscope probe and encompasses a plurality of the optical fiber endfaces.

The method next includes shifting the field of view of the microscope probe to a second discrete position over the connector surface. Each of the first and second discrete positions encompasses a different subset of the multiple optical fiber endfaces.

The method finally includes acquiring an image of another portion of the connector surface of the multiple-fiber connector which is defined by the second discrete position.

In one example, the first and second discrete portions may be embodied by half portions of the connector surface, allowing the inspection of the entire array of optical fiber through the analyses of the two acquired images. The acquired images may optionally include a positioning reference, such as for example a portion of the connector surface adjacent the array of optical fiber endfaces.

In some embodiments the method may further include shifting the field of view to at least one additional discrete position over the connector surface. Each additional discrete position encompasses a different subset of the multiple optical fiber endfaces. The method further involves acquiring images of portions of the connector surface of the multiple-fiber connector defined by the additional discrete positions.

In another aspect, there may be provided a method method for inspecting a multiple-fiber connector comprising an array of optical fiber endfaces over a connector surface, the method including acquiring an image of a portion of the connector surface of the multiple-fiber connector using an inspection system comprising a microscope probe and having a field of view on the connector surface. The imaged portion may encompass the optical fiber endfaces of the entire array, allowing an analysis therefor from a single image.

Of course, numerous modifications could be made to the embodiments described above without departing from the scope of the invention. For example, although the illustrated embodiments show simple lenses as optical elements it will be readily understood that more complex optical elements may be used in various implementations. In one such implementation, the optical elements may for example be embodied by a bi-telecentric lens system that allows shifting the imaging path on the connector surface such that it remains parallel but offset relative to the imaging axis of the microscope probe.

The invention claimed is:

1. An inspection system for inspecting a multiple-fiber connector comprising an array of optical fiber endfaces over a connector surface, the system comprising:
    a microscope probe having a field of view;
    a probe tip configured to provide an optical path between the microscope probe and the multiple-fiber connector, and comprising a mating interface configured to interface with the multiple-fiber connector, the probe tip and microscope probe being configured such that the field of view of the microscope probe at the mating interface is sufficiently large to cover a portion of the connector surface encompassing a plurality of the optical fiber endfaces; and
    a shifting mechanism operable to shift the field of view of the microscope probe between at least two discrete positions over the connector surface when the mating interface of the probe tip is interfaced with the multiple-fiber connector, each of the at least two discrete positions encompassing a different subset of the multiple optical fiber endfaces, one or more of the at least two discrete positions further encompassing at least one positioning reference.

2. The inspection system according to claim 1, wherein one or more of the at least two discrete positions further encompassing at least one positioning reference.

3. The inspection system according to claim 2, wherein the positioning reference is a portion of the connector surface adjacent the array of optical fiber endfaces.

4. The inspection system according to claim 1, wherein the at least two discrete positions consist of two discrete positions covering respective half portions of the connector surface.

5. The inspection system according to claim 1, wherein the at least two discrete positions respectively cover end portions of the connector surface and at least one intermediate portion therebetween.

6. The inspection system according to claim 1, wherein the at least two discrete positions consist of four discrete positions covering respective quadrant portions of the connector surface.

7. The inspection system according to claim 1, wherein the shifting mechanism comprises:
    An optical element in said optical path between the microscope probe and the multiple-fiber connector;
    An optical element support mounted in the probe tip and receiving the optical element therein and movable to move the optical element so as to shift the field of view of the microscope probe between the at least two discrete positions.

8. The inspection system according to claim 7, wherein the optical element support is rotatable between pre-set angular positions about a rotation axis substantially normal to the mating interface.

9. The inspection system according to claim 8, wherein the optical element and optical element support are configured such that an optical axis of said optical element extends parallel to and offset the rotation axis of the optical element support.

10. The inspection system according to claim 7, wherein the shifting mechanism further comprises a push-pull mechanism cooperating with the movable support to rotate the same.

11. The inspection system according to claim 10, wherein the push-pull mechanism comprises:
    a rotatable cylindrical housing in which is mounted the at least one optical element, the cylindrical housing having an outer surface provided with a groove defining a path;
    an inner sleeve integral with or rigidly affixed to the mating interface of the probe tip and receiving the cylindrical housing therein;
    an outer sleeve rigidly connected to the microscope probe and surrounding the inner sleeve, the outer housing having one or more guiding pins projecting inwardly and engaged in the groove of the cylindrical housing, the guiding pin extending through a slit in the inner sleeve; and
    a resilient element biasing the outer sleeve against the inner sleeve.

12. The inspection system according to claim 1, wherein the shifting mechanism comprises:
    a cylindrical housing in which is mounted the at least one element;
    an inner sleeve integral with or rigidly affixed to the mating interface of the probe tip, the inner sleeve defining a cavity having a cavity wall and receiving the cylindrical housing therein;
    an outer sleeve provided in a sliding engagement over the inner sleeve;
    at least one pairs of alignment guides provided transversally through the outer sleeve and the inner sleeve, the alignment guides of each pair being disposed opposite each other and have corresponding extremities projecting inside the cavity equidistantly with respect to the cavity wall;
wherein the cylindrical housing has a profiled outer surface defining matching curved shapes on opposite transversal sides of the cylindrical housing in alignment with each pair of alignment guides.

13. The inspection system according to claim 1, wherein the shifting mechanism comprises a swivel coupler allowing a relative rotation between the microscope probe and the multiple-fiber connector.

14. A probe tip connectable to a microscope probe for inspecting a multiple-fiber connector comprising an array of optical fiber endfaces over a connector surface, the microscope probe having a field of view, the probe tip comprising:
    a mating interface configured to interface with the multiple-fiber connector, the probe tip being configured so that the field of view of the microscope probe at the mating interface is sufficiently large to cover a portion of the connector surface encompassing a plurality of the optical fiber endfaces; and
    a shifting mechanism operable to shift the field of view of the microscope probe between at least two discrete positions over the connector surface when the mating interface is interfaced with the multiple-fiber connector, each of the at least two discrete positions encompassing a different subset of the multiple optical fiber endfaces.

15. The probe tip according to claim 14, wherein one or more of the at least two discrete positions further encompassing at least one positioning reference.

16. The probe tip according to claim 15, wherein the positioning reference is a portion of the connector surface adjacent the array of optical fiber endfaces.

17. The probe tip according to claim 14, wherein the at least two discrete positions consist of two discrete positions covering respective half portions of the connector surface.

18. The probe tip according to claim 14, wherein the at least two discrete positions respectively cover end portions of the connector surface and at least one intermediate portion therebetween.

19. The probe tip according to claim 14, wherein the at least two discrete positions consist of four discrete positions covering respective quadrant portions of the connector surface.

20. A method for inspecting a multiple-fiber connector comprising an array of optical fiber endfaces over a connector surface, the method comprising:
    acquiring an image of a portion of the connector surface of the multiple-fiber connector using an inspection system comprising a microscope probe and having a field of view on the connector surface, the imaged portion being defined by a first discrete position of the field of view of the microscope probe and encompassing a plurality of the optical fiber endfaces;
    shifting the field of view of the microscope probe to a second discrete position over the connector surface, each of the first and second discrete positions encompassing a different subset of the multiple optical fiber endfaces; and
    acquiring an image of another portion of the connector surface of the multiple-fiber connector which is defined by the second discrete position.

21. The method according to claim 20, wherein at least one of the images encompasses at least one positioning reference.

22. The method according to claim 20, further comprising shifting the field of view to at least one additional discrete position over the connector surface, each additional discrete position encompassing a different subset of the multiple optical fiber endfaces, and acquiring images of portions of the connector surface of the multiple-fiber connector defined by the additional discrete positions.

* * * * *